(12) United States Patent
Costello

(10) Patent No.: US 6,445,986 B1
(45) Date of Patent: Sep. 3, 2002

(54) STATIC RANDOM ACCESS MEMORY BACKUP

(75) Inventor: Robert E. Costello, Shelby Township, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/627,857

(22) Filed: Jul. 28, 2000

(51) Int. Cl.[7] .......................... G01R 31/00; G06F 1/30; G06F 12/16
(52) U.S. Cl. .......................... 701/35; 701/22; 702/63; 307/66
(58) Field of Search .............................. 701/22, 29, 35; 702/63; 307/66, 9.1; 713/340, 300; 714/22, 14, 24; 365/229; 320/107

(56) References Cited

U.S. PATENT DOCUMENTS

| | | | | |
|---|---|---|---|---|
| 3,643,063 A | * | 2/1972 | Marsh et al. ............... | 235/61.1 |
| 4,477,764 A | * | 10/1984 | Pollard ....................... | 320/62 |
| 4,611,289 A | * | 9/1986 | Coppola ..................... | 364/492 |
| 4,989,146 A | * | 1/1991 | Imajo ....................... | 364/424.04 |
| 5,204,963 A | * | 4/1993 | Noya et al. ................. | 395/750 |
| 5,596,512 A | * | 1/1997 | Wong et al. ................. | 364/550 |
| 5,783,872 A | * | 7/1998 | Blair ........................... | 307/46 |
| 5,923,099 A | * | 7/1999 | Bilir ........................... | 307/64 |
| 5,941,328 A | * | 8/1999 | Lyons et al. ................. | 180/65.1 |
| 5,986,462 A | * | 11/1999 | Thomas et al. .............. | 324/771 |
| 6,053,842 A | * | 4/2000 | Kitada et al. ................ | 477/5 |
| 6,088,636 A | * | 7/2000 | Chigumira et al. ........... | 701/26 |
| 6,144,110 A | * | 11/2000 | Matsuda et al. ............. | 307/10.1 |

* cited by examiner

Primary Examiner—Tan Nguyen
Assistant Examiner—Dalena Tran
(74) Attorney, Agent, or Firm—Carlson Gaskey & Olds

(57) ABSTRACT

A data logging system includes a data logging unit, a primary power source, an auxiliary power source and a controller. The controller detects whether the primary power source is available or unavailable and the time at which it became available or unavailable. From the time data the controller will then determine the total time the primary power source was unavailable to power the system. The controller adjusts or increases a predetermined auxiliary power source value by the auxiliary power source usage time period. Upon each occurrence in which the primary power source again becomes unavailable, the controller performs the same operations and further adjust or increases the previously reduced predetermined auxiliary power source value by the next auxiliary power source usage time period. Adjusting or increasing the predetermined auxiliary power source value will continue until a predetermined value is reached which triggers an alert. The alert indicates to an operator that the system requires service.

23 Claims, 1 Drawing Sheet

STATIC RANDOM ACCESS MEMORY BACKUP

BACKGROUND OF THE INVENTION

The present invention relates to an auxiliary power source, and more particularly to a battery life monitoring system which assures the availability of a backup battery without continued monitoring of the backup battery.

Many vehicles include a data logging system which monitors and records a multiple of vehicle systems and events. The system typically monitors and records such vehicle parameters as engine performance, brake system usage, transmission shift points and other vehicle information. Importantly, the data logging system typically includes a real time clock (RTC) which allows the data logging system to record the occurrence time and duration of each vehicle event.

The system commonly draws power from an external power source such as a main vehicle battery. In some instances, such as during vehicle maintenance or main battery failure, the system could be without power. Loss of system power would alter the RTC and possible result in data loss. An auxiliary power source such as a battery backup is typically integrated with the system to assure that a power source independent of the external power source is always available to the system.

Over time and usage even the auxiliary power source will become unable to power the system should the external power source be unavailable. As this is undesirable, an auxiliary power source monitoring system is typically provided for the data logging system. To monitor the auxiliary power source at all times, however, would drain power from the auxiliary power source and thereby reduce the auxiliary power source's life.

Accordingly, it is desirable to provide a monitoring system for the auxiliary power source which does not draw power from the auxiliary power source.

SUMMARY OF THE INVENTION

The system according to the present invention generally includes a data logging unit, a primary power source, an auxiliary power source and a controller.

The data logging unit monitors and records vehicle event data from each of a plurality of vehicle components. The data logging unit preferably stores vehicle event data from each component in a memory for later analysis and diagnosis. The data logging unit further records time data associated with the vehicle event data through a clock.

During normal system operation, the primary power source provides all necessary power. Should, however, the primary power source becomes unavailable, the system draws from the auxiliary power source to prevent data loss. The controller detects whether the primary power source is available or unavailable and the time at which it became available or unavailable. From the time data the controller will then determine the total time the primary power source was unavailable to power the system. This is the auxiliary power source usage time period. In other words, this is the duration of time that was drained from the auxiliary power source during which the primary power source was unavailable.

The controller reduces a predetermined auxiliary power source value by the auxiliary power source usage time period. The predetermined auxiliary power source value is a calculated value based upon the expected life of the auxiliary power source and is typically available from the power source manufacturer. Upon each occurrence in which the primary power source again becomes unavailable, the controller performs the same operations and further reduces the previously reduced predetermined auxiliary power source value by the next auxiliary power source usage time period. Reduction in the predetermined auxiliary power source value will continue until a predetermined value is reached.

The controller identifies when the predetermined auxiliary power source value reaches the predetermined value and triggers an alert. The alert is preferably a warning light or the like which indicates to an operator that the system requires service. During service the auxiliary power source is replaced and the predetermined auxiliary power source value is reset.

The present invention therefore assures that an auxiliary power source is always available without actually requiring a sensor connected to the power source.

BRIEF DESCRIPTION OF THE DRAWING

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
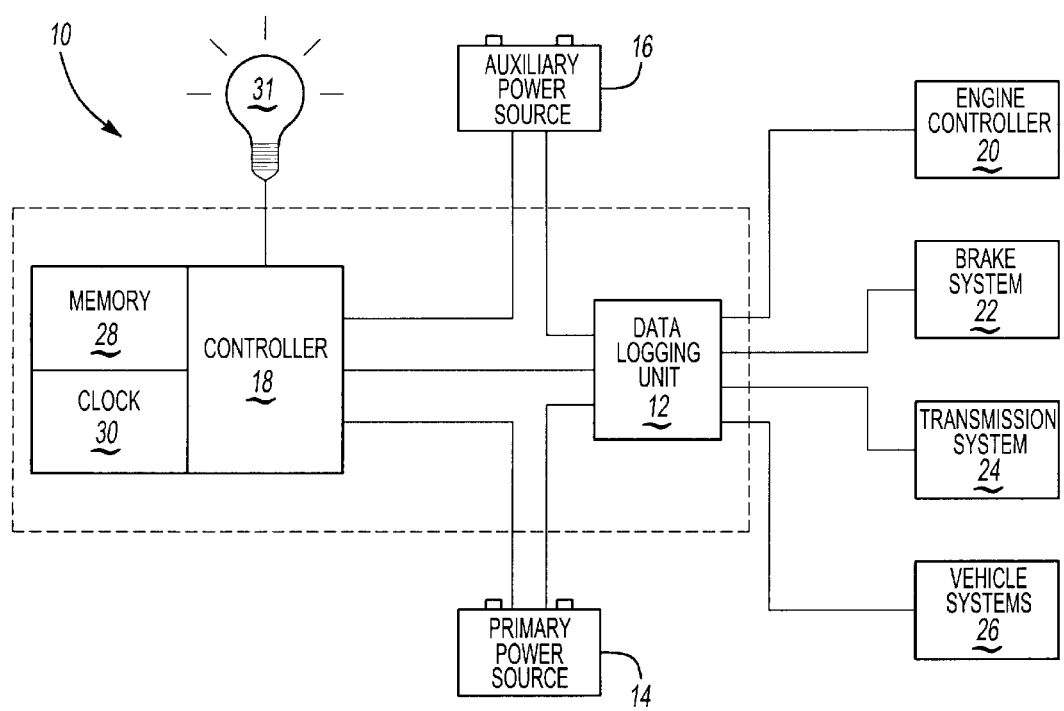
FIG. 1 is a schematic view of the system according to the present invention.

FIG. 1 schematically illustrates a vehicle data logging system 10. The system 10 generally includes a data logging unit 12, a primary power source 14, an auxiliary power source 16 and a controller 18.

The data logging unit 12 is in communication with a plurality of vehicle components such as an engine controller 20, a brake system 22, a transmission system 24, and other vehicle systems 26 (each illustrated schematically). Although particular vehicle components are schematically illustrated in the disclosed embodiment, it should be realized that many other vehicle components of which diagnostic information is desired will benefit from the present invention. The data logging unit 12 monitors and records vehicle event data from each component 20, 22, 24, 26 and preferably stores the vehicle event data in a memory 28. The memory 28 is preferably a Static Random Access Memory (SRAM), however, other storage devices will benefit from the present invention.

The data logging unit 12 further records time data associated with the vehicle event data through a clock 30 which is preferably a Real Time Clock (RTC) 30. The clock 30 provides time data such as day, month, year and time of when the event initiates, when the event ends, event duration, and other time related information. Operation of the clock 30 and detection of the vehicle event data is all preferably implemented in software in the controller 18.

To power the system 10 and maintain continues power to the memory 28, and the clock 30, the system 10 is connected to the primary power source 14. The primary power source 14 is typically a remotely located main vehicle battery, however, other dedicated power sources may also be provided. During normal system 10 operation, the primary power source 14 provides all necessary power. Should, however, the primary power source 14 becomes unavailable, the system 10 is also connected to the auxiliary power source 16. The auxiliary power source 16 is preferably, one or more batteries located within the system 10.

The system 10 preferably includes the controller 18. The controller 18 communicates with the data logging unit 12, to detect whether the primary power source 14 is available or unavailable. The controller 18 will assure that all pertinent vehicle event data and the time is stored in the memory 28 should the primary power source 14 becomes unavailable. At this time, the auxiliary power supply 16 will take over and power the system 10 to guarantee that no vehicle event data is lost. The auxiliary power supply 16 also assures that the clock 30 does not lose time. Switchover between the primary power source 14 and the secondary power source 16 without intervening loss of data is well known in the power supply art and forms no part of the instant invention.

When the primary power source 14 again becomes available, the controller 18 will detect its availability. Substantially simultaneously, the auxiliary power source 16 will no longer power the system 10. Upon detection of the primary power source 14, the controller 18 will determine the time when the primary power source 14 became available. From the time data the controller 18 will then determine the total time the primary power source 14 was unavailable to power the system 10. This is the auxiliary power source usage time period. In other words, this is the duration of time that was drained from the auxiliary power source 16 during which the primary power source 14 was unavailable.

The controller 18 will reduce a predetermined auxiliary power source value by the auxiliary power source usage time period. The predetermined auxiliary power source value is a calculated value based upon the expected life of the auxiliary power source 16 and is typically available from the power source manufacturer. The predetermined auxiliary power source value is preferably stored in the memory 28 and the subtraction therefrom is preferably implemented in software within the controller 18.

Upon each occurrence in which the primary power source 14 again becomes unavailable, the controller 18 performs the same operations. The controller 18 will again adjust the previously reduced predetermined auxiliary power source value by the next auxiliary power source usage time period. The controller 18 can reduce a calculated value or add time to the value if the data is started from zero. Reduction in the predetermined auxiliary power source value will continue until a predetermined value is reached. Preferably, the predetermined value includes a margin of error to account for power source variability.

The controller 18 identifies when the predetermined auxiliary power source value reaches the predetermined value and triggers an alert 31. The alert 31 is preferably a warning light or the like which indicates to an operator that the system 10 requires service. During service the auxiliary power source 16 is replaced and the predetermined auxiliary power source value is reset.

The present invention therefore assures that an auxiliary power source is always available without actually requiring a sensor connected to the power source.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle data logging system comprising:
   a data logging unit;
   a primary power source to power said data logging unit;
   an auxiliary power source to power said data logging unit when said primary power source is unavailable; and
   a controller in communication with said data logging unit, said controller operable to determine a cumulative auxiliary power source usage time period by determining a total time during which said primary power source is unavailable.

2. The system as recited in claim 1, wherein said controller reduces a predetermined auxiliary power source value by said auxiliary power source usage time period each time said primary power source is unavailable.

3. The system as recited in claim 1, further comprising a clock, said controller operable to identify a time at which said primary power source becomes unavailable and available.

4. The system as recited in claim 3, further comprising a memory, said controller operable to store said time within said memory.

5. The system as recited in claim 3, further comprising an alert, said controller operable to trigger said alert when said predetermined calculated auxiliary power source value is reduced to a predetermined value.

6. The system as recited in claim 1, wherein said data logging unit is in communication with a vehicle system.

7. The system as recited in claim 1, wherein said auxiliary power source is a battery.

8. The system as recited in claim 1, wherein said auxiliary power source is a non-rechargeable battery.

9. A method of monitoring an auxiliary power source in a vehicle data logging system comprising the steps of:
   (1) measuring a time period during which a primary power source is unavailable; and
   (2) adjusting a predetermined auxiliary power source value by said time period each time said primary power source is unavailable.

10. A method as recited in claim 9, wherein said step (1) further comprising the step of detecting whether said primary power source is available and unavailable.

11. A method as recited in claim 9, further comprising the step of storing a time at which said primary power source becomes unavailable and available.

12. A method as recited in claim 9, further comprising the step of activating an alert when said predetermined auxiliary power source value is reduced to a predetermined value.

13. A method as recited in claim 9, wherein said step (2) is performed when said primary source again becomes available.

14. A method as recited in claim 9, wherein said predetermined calculated auxiliary power source value is less than a value at which the auxiliary power source fails.

15. A method as recited in claim 9, wherein said step (2) further comprises determining a cumulative time during which the primary power source is unavailable.

16. A method as recited in claim 9, wherein said step (5) further comprises determining a cumulative time during which the primary power source is unavailable.

17. A method of monitoring an auxiliary power source in a vehicle data logging system comprising the steps of:

(1) detecting when a primary power source is unavailable;

(2) storing a time when said primary power source becomes unavailable;

(3) detecting when said primary power source is available;

(4) storing a time when said primary power source becomes available;

(5) determining a time period during which said primary power source is unavailable from said step (2) and said step (4); and (6) adjusting a predetermined calculated auxiliary power source value by said time period determined in said step (5) each time said primary power source is unavailable.

18. A method as recited in claim 17, further comprising the step of activating an alert when said predetermined auxiliary power source value is reduced to a predetermined value.

19. A method as recited in claim 17, further comprising the step of resetting said predetermined auxiliary power source value upon replacement of an auxiliary power source.

20. A method as recited in claim 17, wherein said step (6) is performed when said primary source again becomes available.

21. A method as recited in claim 17, wherein said predetermined calculated auxiliary power source value is less than a value at which the auxiliary power source fails.

22. A vehicle data logging system comprising:

a data logging unit;

a primary power source to power said data logging unit;

an auxiliary power source to power said data logging unit when said primary power source is unavailable; and a controller in communication with said data logging unit, said controller operable to determine an auxiliary power source usage time period during which said primary power source is unavailable, said controller reducing a predetermined auxiliary power source value by said auxiliary power source usage time period each time said primary power source is unavailable.

23. The system as recited in claim 22, wherein said auxiliary power source is a non-rechargeable battery.

* * * * *